US006968704B2

(12) United States Patent
Hood

(10) Patent No.: US 6,968,704 B2
(45) Date of Patent: Nov. 29, 2005

(54) METHOD AND SYSTEM FOR DENSIFYING CRYOGENIC PROPELLANTS

(75) Inventor: Charles B. Hood, Naples, FL (US)

(73) Assignee: PHPK Technologies Inc., Westerville, OH (US)

(*) Notice: Subject to any disclaimer, the term of this patent is extended or adjusted under 35 U.S.C. 154(b) by 116 days.

(21) Appl. No.: 10/386,085

(22) Filed: Mar. 11, 2003

(65) Prior Publication Data
US 2003/0172659 A1 Sep. 18, 2003

Related U.S. Application Data

(62) Division of application No. 09/614,634, filed on Jul. 12, 2000, now Pat. No. 6,532,750.

(51) Int. Cl.[7] .............................. F17C 11/00
(52) U.S. Cl. .......................... 62/46.1
(58) Field of Search ................. 62/46.1, 48.1

(56) References Cited

U.S. PATENT DOCUMENTS 4,264,567 A * 4/1981 Pinto ........................ 423/359
5,644,920 A * 7/1997 Lak et al. ................. 62/47.1
6,131,395 A  10/2000 Greene et al.

FOREIGN PATENT DOCUMENTS

EP           1116926        7/2001

* cited by examiner

Primary Examiner—Denise L. Esquivel
Assistant Examiner—Malik N. Drake
(74) Attorney, Agent, or Firm—Thompson Hine LLP

(57) ABSTRACT

The present invention relates to methods and systems for densifying liquids, specifically the densification of cryogenic propellants. A preferred system of the present invention subcools and densifies liquid propellants by utilizing a countercurrent gas or liquid flow. The countercurrent flow preferably utilizes a gas having a lower boiling point than the propellants. A packed tower may then be used, at or above atmospheric pressure, to introduce the countercurrent flow to the propellant. This methodology avoids the costs and problems associated with subatmospheric operation. A preferred embodiment is directed toward the densification of liquid oxygen, with a similar embodiment directed toward the simultaneous densification of liquid oxygen and liquid hydrogen. Systems and methods of the present invention may also be used to densify other liquids in similar fashion.

10 Claims, 6 Drawing Sheets

LERC Oxygen Densifier

LERC Hydrogen Densifier

US 6,968,704 B2

METHOD AND SYSTEM FOR DENSIFYING CRYOGENIC PROPELLANTS

CROSS REFERENCE TO RELATED APPLICATIONS

This application is a divisional of U.S. application Ser. No. 09/614,634 now U.S. Pat. No. 6,532,750, filed Jul. 12, 2000, entitled Method and System for Densifying Cryogenic Propellants, which is expressly incorporated herein by reference.

TECHNICAL FIELD OF THE INVENTION

The present invention is in the field of cryogenic propellants and densification processes and systems therefor.

BACKGROUND OF THE INVENTION

This invention relates to the densification of liquids. More specifically, this invention relates to the densification of cryogenic propellants at or above atmospheric pressure.

The densification of cryogenic propellants is anticipated to become more necessary in the future to maximize fuel loading and payloads. At that time, there will be a demand for densification systems that will function with maximum efficiency and minimum overall cost. These densification systems are particularly of interest to aerospace companies and government agencies involved in launch site construction. Present processes for cryogenic propellant densification are based on heat exchange with cryogenic fluids boiling under reduced pressure, achieved with the use of expensive and difficult-to-control compressor systems. These densification systems require large banks of submerged coils with trains of vacuum pumps or expensive cold blowers to produce the required reduced pressures. It is therefore desirable to develop a system avoiding these problems and costs by operating at or above atmospheric pressure. Estimates indicate that such a system would have significantly reduced capital investment and operating costs coupled with improved reliability and availability.

It is therefore an object of the present invention to develop a method and system for densifying cryogenic propellants at or above atmospheric pressure.

Although described with respect to the fields of cryogenics and propellants, it will be appreciated that similar advantages of liquid densification at or above atmospheric pressure may obtain in other applications of the present invention. Such advantages may become apparent to one of ordinary skill in the art in light of the present disclosure or through practice of the invention.

SUMMARY OF THE INVENTION

The present invention includes densification apparatus, densification devices, and densification systems. The invention also includes machines or electronic devices using these aspects of the invention. The present invention may also be used to upgrade, repair or retrofit existing machines or electronic devices or instruments of these types, using methods and components known in the art. The present invention also includes methods for achieving such densification.

The heat exchanging elements or devices that may be used in the systems and methods of the present invention may include counterflow heat exchangers and vapor phase heat exchange chambers. Accordingly, it will be understood that any appropriate heat exchanging element(s) may be used in the systems and methods of the present invention in accordance with the appropriate temperature change, phase and mass flow characteristics of the fuel to be densified, as will be appreciated from the examples presented herein. Accordingly, the heat exchanging elements that may be used in the systems and methods of the present invention may include counterflow heat exchangers (such as plate fin heat exchangers, such as those commercially available from such companies as Chart Corporation of Mayfield Heights Ohio, Sumitomo Precision Products of Japan, and Marsten-Palmer of the United Kingdom), and vapor phase heat exchange chambers. The systems and methods of the present invention may use vapor heat exchange chambers such as packed towers. The preferred vapor heat exchange chamber used in the systems and methods of the present invention is a packed heat exchange tower, using commercially available tower packing materials commonly used in the chemical industry.

Accordingly, it will be understood that in the following summary and detailed description reference to heat exchangers or packed towers may also include alternative heat exchange elements as generally described above.

The systems and methods of the present invention may be respectively operated and conducted in order to produce densified cryogenic propellants such as liquid oxygen and/or liquid hydrogen. Thus, the present invention relates to a system for densifying and subcooling liquid oxygen and/or hydrogen.

One of the advantages of the systems and methods of the present invention is that they may be respectively operated and conducted at or just slightly above ambient atmospheric pressure.

One system utilizes a conduit adapted to carry flows of liquid, preferably liquid oxygen, liquid nitrogen, and liquid hydrogen. To avoid direct contact of hydrogen and oxygen, a first heat exchanger is used to allow only thermal interaction of the liquid oxygen and liquid nitrogen. The liquid oxygen and liquid nitrogen flow in opposing directions through the first heat exchanger. The first heat exchanger cools and thereby densifies the liquid oxygen.

A second heat exchanger is preferably also used, adapted to allow thermal interaction of the liquid nitrogen with the liquid hydrogen. The liquid nitrogen and liquid hydrogen preferably flow in opposing directions through the second heat exchanger that is controlled so that the liquid hydrogen is vaporized through the thermal interaction before leaving the second heat exchanger. The second heat exchanger is preferably adapted to cool the liquid nitrogen.

A packed tower is used, in conjunction with or without the second heat exchanger, adapted to allow thermal interaction of the liquid nitrogen with the liquid or gaseous hydrogen, the liquid nitrogen and hydrogen flowing in opposing directions through the packed tower. The packed tower allows the liquid hydrogen to cool the liquid nitrogen by evaporation and thermal interaction before leaving the packed tower. The packed tower is then adapted to release any vaporized gas comprising the nitrogen and hydrogen.

The system may also recirculate the liquid nitrogen from the first heat exchanger back to the packed tower. The cooled liquid nitrogen is preferably directed from the second heat exchanger to the first heat exchanger. The vaporized hydrogen is preferably directed from the second heat exchanger into the packed tower in order to aid in cooling the liquid nitrogen passing through the tower. The system may also use one or more pumps to generate fluid flow and recirculate the liquid nitrogen.

Also included in the present invention is a system for simultaneously densifying and subcooling liquids, preferably liquid oxygen and liquid hydrogen. The system utilizes conduit adapted to carry flows of liquid oxygen, liquid nitrogen, liquid hydrogen, and liquid helium.

The system uses a first packed tower, adapted to allow thermal interaction of the helium and liquid hydrogen. The liquid or gaseous helium and liquid hydrogen flow in opposing directions through the packed tower, adapted so that the liquid hydrogen is cooled by evaporation and thermal interaction before leaving the packed tower. The first packed tower is also adapted to direct any vaporized gas of the helium and hydrogen out of the packed tower.

A first heat exchanger is preferably used, adapted to allow thermal interaction of the liquid hydrogen with the liquid helium. The liquid hydrogen and liquid helium flow in opposing directions through the first heat exchanger, preferably controlled so that the liquid helium is vaporized through the thermal interaction before leaving the first heat exchanger. The first heat exchanger is preferably also adapted to cool the liquid hydrogen. The portion of the system mentioned thus far may be used alone if only hydrogen is to be densified.

In the dual-fluid densification system, a second heat exchanger is preferably used to allow thermal interaction of the liquid nitrogen with the vaporized hydrogen and vaporized helium. The liquid nitrogen is adapted to flow through the second heat exchanger in a direction opposite the flow of vaporized hydrogen and helium. The second heat exchanger is adapted to cool the liquid nitrogen.

A second packed tower is used, adapted to allow thermal interaction of the liquid nitrogen with the vaporized hydrogen and helium. The liquid nitrogen flows through the second packed tower in a direction opposite the flow of vaporized hydrogen and helium, adapted so that the liquid nitrogen is cooled by evaporation and thermal interaction before leaving the packed tower. The second packed tower is also adapted to release from the system any vaporized gas comprising the nitrogen, helium, and hydrogen.

The system uses a third heat exchanger, adapted to allow thermal interaction of the liquid oxygen with the liquid nitrogen. The liquid oxygen flows through the third heat exchanger in a direction opposite the flow of liquid nitrogen. The third heat exchanger is adapted to cool the liquid oxygen.

The system may also recirculate the liquid nitrogen, from the third heat exchanger back to the second packed tower. The cooled liquid nitrogen is preferably directed from the second heat exchanger to the third heat exchanger, where it is used to cool the liquid oxygen. The system may use one or more pumps to generate liquid flow.

The invention also includes a method of densifying a liquid, preferably liquid oxygen. In the method, a flow of liquid oxygen is passed through a first heat exchanger. A flow of liquid nitrogen is also passed through the first heat exchanger, in a direction opposite the flow of liquid oxygen. The first heat exchanger is adapted to allow thermal interaction of the liquid oxygen with the liquid nitrogen. The first heat exchanger is adapted so that the flow of liquid oxygen is cooled so as to densify the liquid oxygen.

The method also involves passing the flow of liquid nitrogen exiting the first heat exchanger through a packed tower. The packed tower has a flow of vaporized or liquid hydrogen running in a direction opposite the flow of liquid nitrogen that is allowed to thermally interact with the liquid nitrogen, whereby the liquid nitrogen may be cooled by evaporation before exiting the packed tower. The packed tower is adapted to vent any vaporized nitrogen or vaporized hydrogen from the packed tower.

A preferred step involves passing the cooled liquid nitrogen exiting the packed tower and a flow of liquid hydrogen through a second heat exchanger. The flow of liquid hydrogen is passed through the heat exchanger before entering the packed tower as vaporized hydrogen, the flow of liquid hydrogen passed through the heat exchanger in a direction opposite the flow of liquid nitrogen. The second heat exchanger is adapted to allow thermal interaction of the liquid hydrogen with the liquid nitrogen, controlled so that the liquid hydrogen is vaporized through the thermal interaction before leaving the second heat exchanger. The second heat exchanger is also adapted to cool the liquid nitrogen before the cooled liquid nitrogen is passed to the first heat exchanger.

The method may additionally comprise the step of capturing the flow of densified liquid oxygen exiting the first heat exchanger. Another step may involve venting the flow of vaporized hydrogen and vaporized nitrogen to atmosphere.

The present invention also includes a method for simultaneously densifying two liquids, preferably liquid oxygen and liquid hydrogen. The preferred method involves passing a flow of liquid hydrogen through a first packed tower. A flow of liquid or gaseous helium is also passed through the first packed tower, the helium flowing through the first packed tower in a direction opposite the flow of liquid hydrogen. The first packed tower is adapted to allow thermal interaction of the helium with the hydrogen. The first packed tower additionally allows any vaporized hydrogen or vaporized helium to pass from the tower. The first packed tower is also adapted so that the flow of liquid hydrogen is cooled by evaporation, so as to densify the liquid hydrogen.

The method preferably also involves passing the cooled liquid hydrogen exiting the first packed tower and the flow of liquid helium through a first heat exchanger. The first heat exchanger is preferably adapted to allow thermal interaction of the liquid hydrogen with the liquid helium. The liquid hydrogen and liquid helium flow in opposing directions through the first heat exchanger, preferably controlled so that the liquid helium is vaporized through the thermal interaction before leaving the first heat exchanger. The first heat exchanger is preferably also adapted to cool the liquid hydrogen. The steps mentioned thus far may be practiced by themselves if hydrogen alone is to be densified.

Other steps in the two-liquid densification method involve passing a flow of liquid nitrogen through a second packed tower, along with passing the flow of vaporized hydrogen and vaporized helium through the second packed tower. The vaporized hydrogen and vaporized helium are allowed to flow through the second packed tower in a direction opposite the flow of liquid nitrogen, adapted to allow thermal interaction of the vaporized hydrogen and vaporized helium with the liquid nitrogen. The second packed tower is adapted so that any vaporized hydrogen, helium, or nitrogen is passed from the tower. The second packed tower also allows the flow of liquid nitrogen to be cooled before exiting the tower.

The method preferably also involves passing the flow of cooled liquid nitrogen exiting the second packed tower and the flow of vaporized hydrogen and vaporized helium through a second heat exchanger. The flow of vaporized hydrogen and vaporized helium are passed through the second heat exchanger before entering the second packed tower. The flow of liquid nitrogen is passed through the second heat exchanger in a direction opposite the flow of vaporized hydrogen and vaporized helium, adapted to allow thermal interaction of the liquid nitrogen with the vaporized hydrogen and vaporized helium. The second heat exchanger is adapted to further cool the liquid nitrogen.

Other steps in the method involve passing a flow of liquid oxygen through a third heat exchanger, along with passing the flow of cooled liquid nitrogen through the third heat exchanger. The liquid nitrogen flows through the third heat exchanger in a direction opposite the flow of liquid oxygen, adapted to allow thermal interaction of the liquid oxygen with the liquid nitrogen. The third heat exchanger is adapted so that the flow of liquid oxygen is cooled before exiting the third heat exchanger, such that the liquid oxygen is densified. The flow of liquid nitrogen is then directed back into the second packed tower.

The method may additionally comprise the step of capturing the flow of densified liquid hydrogen exiting the first heat exchanger. The flow of densified liquid oxygen exiting the third heat exchanger may also be captured. The method may additionally involve venting the flow of vaporized hydrogen, helium, and nitrogen to atmosphere.

The densified cryogenic propellants produced in accordance with the methods of the present invention may be conducted into any appropriate container. For instance, the propellants may be dispensed directly into the fuel tanks of a rocket engine. Preferably, the densified cryogenic propellants are circulated into and out of the rocket fuel tank so as to allow for the fuel tank to be cooled such that the densified cryogenic propellants may reach their maximum possible densified state within the rocket fuel tank(s). Accordingly, the systems of the present invention include conduits to supply the densified fuel to a rocket engine fuel tank (or tanks), and preferably to recirculate the densified fuel into an out of the rocket engine fuel tank(s). The present invention thus also includes a system as described above attached by conduits to one or more rocket engine fuel tanks, preferably at the launch site of a rocket.

DETAILED DESCRIPTION OF THE PREFERRED EMBODIMENT(S)

In accordance with the foregoing summary, the following presents a detailed description of the preferred embodiment of the invention that is currently considered to be the best mode.

A preferred system of the present invention subcools and densifies liquid propellants by utilizing a countercurrent gas or liquid flow. The countercurrent flow preferably utilizes a gas having a lower boiling point than the propellants. A packed tower is then preferably used, at or above atmospheric pressure, to introduce the countercurrent flow to a propellant. This methodology avoids the aforementioned cost and problems associated with subatmospheric operation. A preferred embodiment is directed toward the densification of liquid oxygen or hydrogen, with a similar preferred embodiment directed toward simultaneously densifying liquid oxygen and liquid hydrogen. Systems and methods of the present invention may also be used to densify other liquids in similar fashion.

Figure 2:
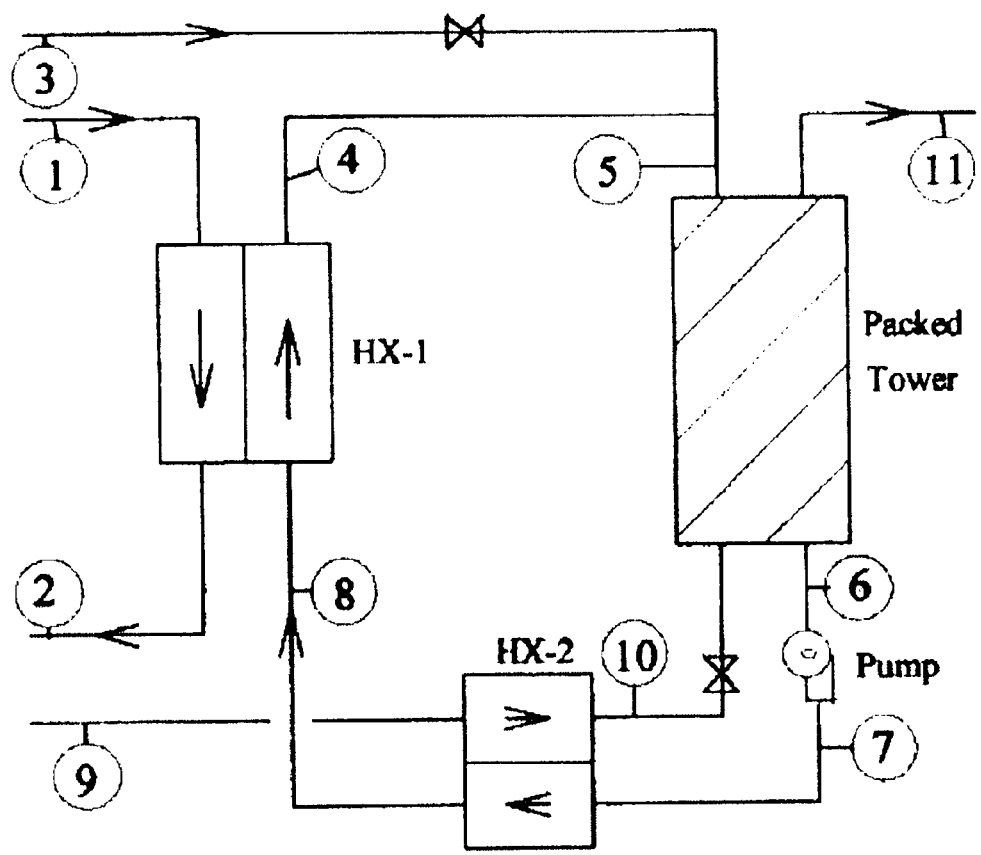
FIG. 2 is another diagram of a single liquid densifier in accordance with one embodiment of the present invention.

In order to determine the feasibility of this approach, a computer program was developed to estimate the conditions in a packed tower. A similar method was described by Brown[1] for analyzing a packed tower with combined heat and mass transfer. The method requires the use of heat transfer coefficients for the gas phase liquid phase, and a mass transfer coefficient. These quantities are known for air and water, and an estimate was made for the liquid nitrogen and hydrogen case. Using this method, the embodiments shown in FIGS. 3 and 7 were designed, and the heat and material balances were calculated. Values at various points along the embodiment of FIG. 2 are given by:

| Point | Gas type | Temp (R) | Pressure (psia) | Flow (lb/hr) | Enthalpy (btu/lb) |
|---|---|---|---|---|---|
| 1 | $LO_2$ | 168 | 100 | 108000 | −54.74 |
| 2 | $LO_2$ | 120 | 85 | 108000 | −73.96 |
| 3 | $LN_2$ | 143.9 | 19.7 | 20855 | −49.77 |
| 4 | $LN_2$ | 143.9 | 19.7 | 158576 | −49.77 |
| 5 | $LN_2$ | 143.9 | 19.7 | 179431 | −49.77 |
| 6 | $LN_2$ | 121 | 19.7 | 158576 | −60.96 |
| 7 | $LN_2$ | 121 | 25.7 | 158576 | −60.96 |
| 8 | $LN_2$ | 117 | 24.7 | 158576 | −62.86 |
| 9 | $LH_2$ | 43.55 | 40 | 790 | −78.6 |
| 10 | $H_2$ | 119 | 40 | 790 | 303.4 |
| 11-H | $H_2$ | 138.5 | 6.8 | 790 | 358.9 |
| 11-N | $N_2$ | 138.5 | 12.9 | 20855 | 33.19 |

Pressures at 11-H and 11-N are partial pressures of the total column pressure of 19.7 psi.

Figure 5:
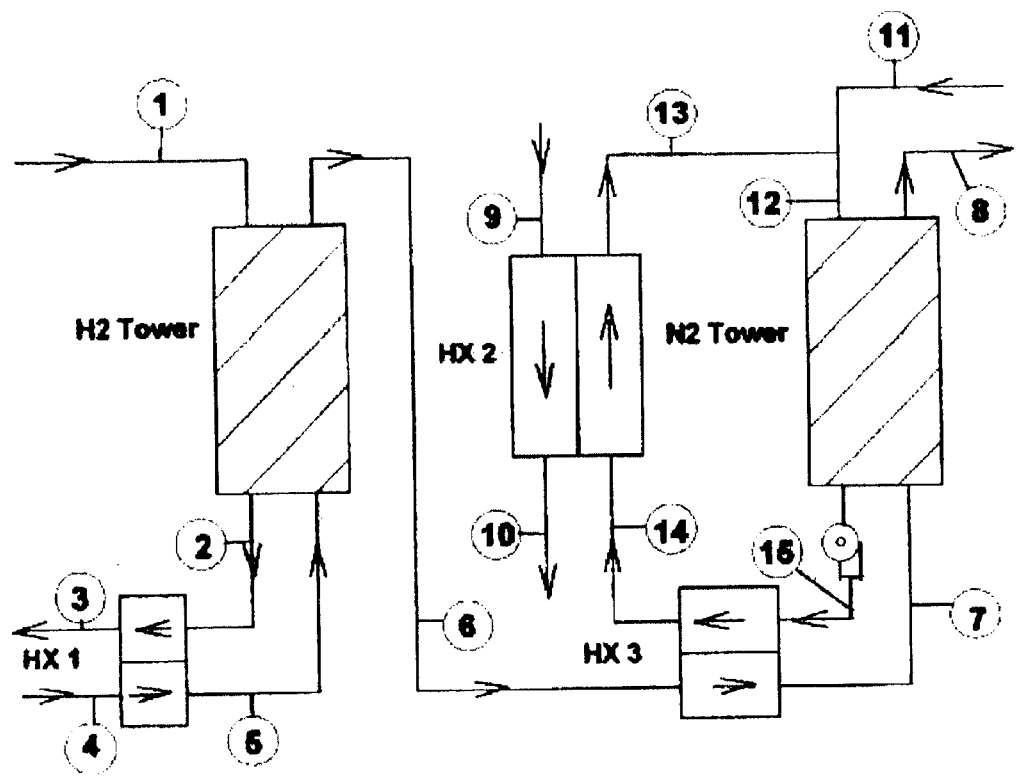
FIG. 5 is another diagram of a dual liquid densifier in accordance with one embodiment of the present invention.

Values at various points along the embodiment of FIG. 5 are given by:

| State Point | Gas type | Temp (R) | Pressure (psia) | Flow (lb/hr) | Enthalpy (btu/lb) |
|---|---|---|---|---|---|
| 1 | $LH_2$ | 38 | 21 | 14879 | −94.151 |
| 2 | $LH_2$ | 28.1 | 21 | 13500 | −114.3 |
| 3 | $LH_2$ | 2727 | 20 | 13500 | −116.15 |
| 4 | LHe | 8.42 | 22 | 790.5 | −1.235 |
| 5 | He | 25 | 21 | 790.5 | 30.154 |
| 6 | He | 37 | 5.1 | 790.5 | 45.608 |
| 6 | $H_2$ | 37 | 15.9 | 1379.4 | 94.294 |
| 7 | He | 119 | 5.1 | 790.5 | 147.43 |
| 7 | $H_2$ | 119 | 15.9 | 1379.4 | 305.75 |
| 8 | He | 138.5 | 3.632 | 790.5 | 171.61 |
| 8 | $H_2$ | 138.5 | 3.168 | 1379.4 | 359.05 |
| 8 | $N_2$ | 138.5 | 12.9 | 19418 | 33.19 |
| 9 | $LO_2$ | 168 | 100 | 108000 | −54.74 |
| 10 | $LO_2$ | 120 | 85 | 108000 | −73.96 |
| 11 | $LN_2$ | 143.9 | 19.7 | 19418 | −49.77 |
| 12 | $LN_2$ | 143.9 | 19.7 | 177994 | −49.77 |
| 13 | $LN_2$ | 143.9 | 19.7 | 158576 | −49.77 |
| 14 | $LN_2$ | 117 | 24.7 | 158576 | −62.86 |
| 15 | $LN_2$ | 122 | 25.7 | 158576 | −60.51 |

Pressures at 6, 7, and 8 are partial pressures of the total pressures of 21 and 20 psi.

Figure 1:
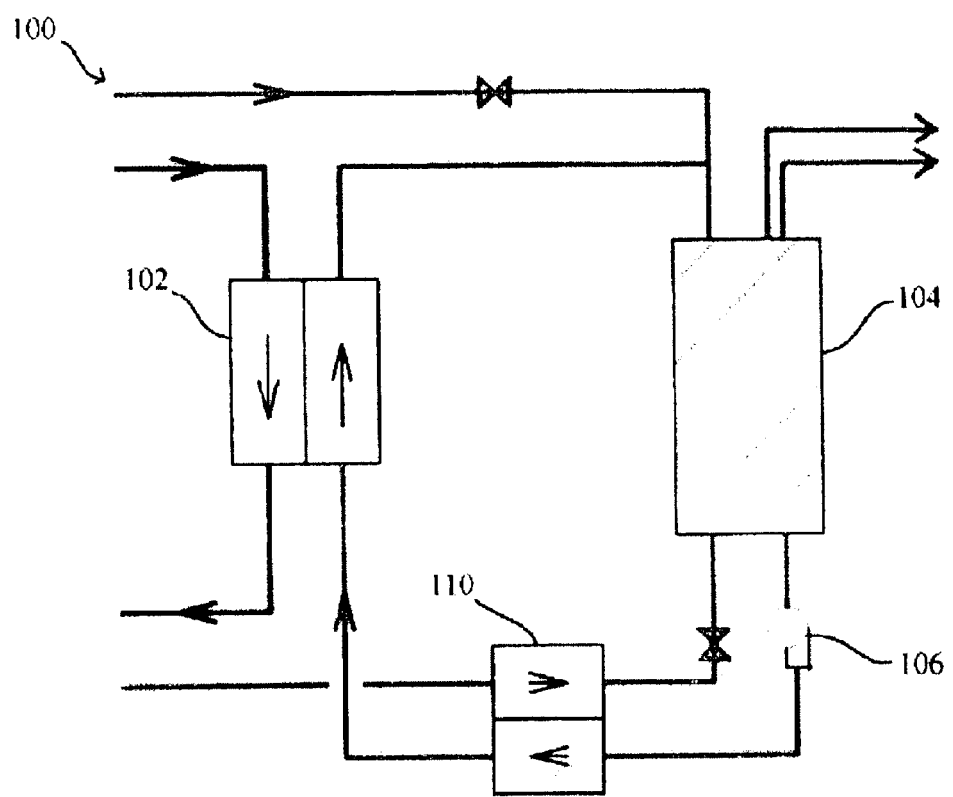
FIG. 1 is a diagram of a single liquid densifier in accordance with one embodiment of the present invention.

An example of a liquid oxygen system 100 is shown in FIG. 1. In this preferred embodiment, hydrogen is introduced into the bottom of a packed tower 104, in either liquid or gaseous form, against a downflow of liquid nitrogen. The cooled liquid nitrogen is then preferably circulated through a heat exchanger 102, cooling a countercurrent stream of liquid oxygen. The liquid nitrogen is then recycled to the tower 104. The cooled liquid oxygen may then be pumped to the launch pad. The system is designed so that substantially all evaporation of liquid nitrogen occurs in the packed tower. The first heat exchanger 102 operates with liquid oxygen countercurrent to the liquid nitrogen stream, controlled so that no vapor is formed in the heat exchanger. An appropriate heat exchanger, such as a brazed aluminum plate-fin exchanger, may be used for this application. An optional second heat exchanger 110, which is preferably smaller than the first exchanger, is preferably a boiler. The boiler preferably vaporizes the hydrogen before it enters the tower 104, eliminating the possibility of freezing nitrogen at the bottom of the tower. The hydrogen and nitrogen gas mixture at the top of the tower 104 may then be continually vented to atmosphere during the process.

Since the density of the liquid oxygen will be increased in the subcooled state, such as from 70.33 to 78.20 lbs/ft$^3$ in one example, an increase of about 11%, more fuel may be loaded per unit volume of a propellant tank as compared to liquid oxygen at normal saturation conditions.

Figure 3:
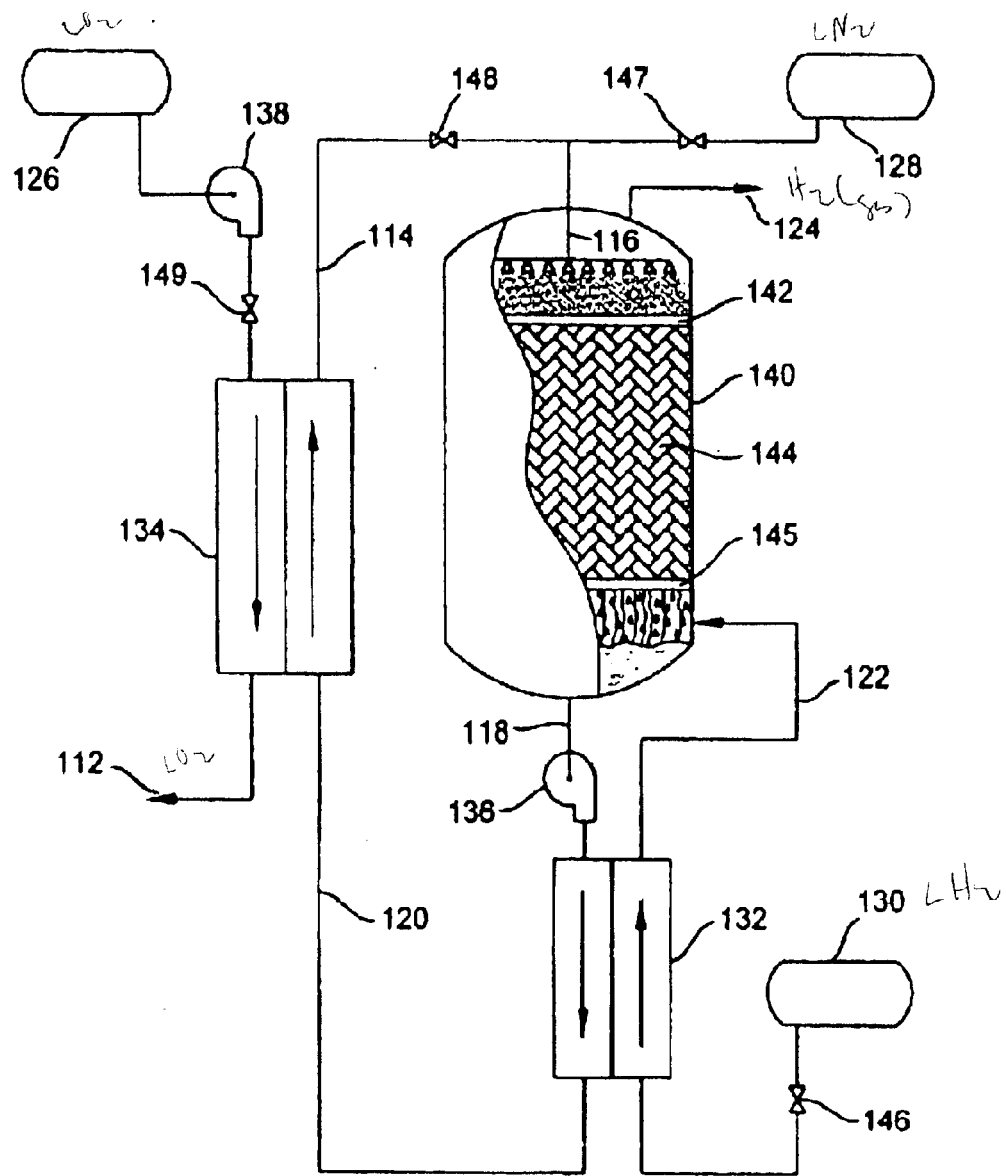
FIG. 3 is another diagram of a single liquid densifier in accordance with one embodiment of the present invention.

A more detailed diagram of this preferred embodiment is shown in FIG. 3. Here, Liquid Oxygen (LO2) is piped from an LO2 storage tank 126 into the system by a feed pump 138. The LO2 passes through a control valve 149 and into a heat exchanger 134. The heat exchanger works to densify the LO2 as described herein. The densified LO2 exiting the exchanger 134 is then carried 112 to the launch site, load, or storage facility.

The Liquid Nitrogen (LN2) enters into the system from the LN2 storage unit 128 through a control valve 147. The LN2 then passes through an LN2 feed 116 into the packed tower 140. The LN2 passes through the liquid distribution grid 142 and into the tower packing material 144. The cooled LN2 then passes through a packing support grid 145 and exits 118 from the tower 140. A recirculating pump 136 then pumps the cooled LN2 through a vaporizer/heat exchanger 132. The cooled LN2 is then piped 120 into the LO2 heat exchanger 134.

The Liquid Hydrogen (LH2) enters the system from the LH2 storage unit 130 through a control valve 146. The LH2 then passes through a vaporizer/heat exchanger 132 having a countercurrent flow of LN2. The vaporized hydrogen then is piped 122 into the bottom of the packed tower 140. The gaseous hydrogen and vaporized nitrogen may then each pass through an outlet 124 and out of the tower 140.

Figure 6:
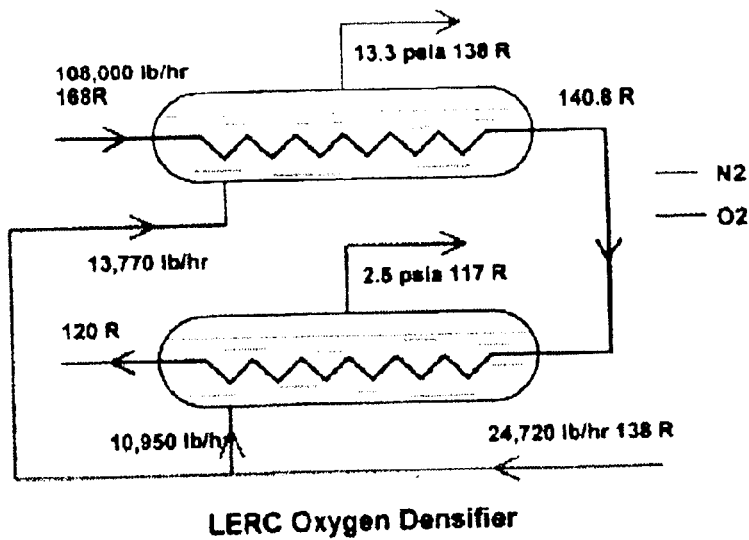
FIG. 6 is a diagram of an oxygen densifier of the prior art.

In order to make a direct comparison with a subatmospheric system, a preferred system was sized to conform to the system designed and constructed by PHPK in 1998 for NASA Glenn Research Center, contract number NAS3-98018, in connection with the X-33 program. The NASA system shown in FIG. 6 consisted of two stages of submerged coils, one at atmospheric pressure, and the other at 2.4 psia. The oxygen flow and temperatures in the preferred system were the same as the NASA system. The NASA system used 24,700 lbs/hr of LN2, compared with the 20,855 lbs/hr of LN2 and 790 lbs/hr of LH2 in the preferred system. At this level of performance, the cost of the fluids for a relatively short duty cycle is comparable to the extra investment for vacuum equipment necessary for the subatmospheric system.

A tower height of about 9 feet was preferred for this embodiment, using 1" Raschig rings for packing. Using the correlation of Lobo[2] for the limiting capacity of tower packings, and assuming the use of 1" Raschig rings, the diameter of the tower needed to handle this capacity was about 4 feet. This was only the active part of the preferred system used for the comparison. The total assembly would preferably be about 12 feet high, enclosed in a cold box of larger dimension. These dimensions may be compared to the LERC system, where the two subcoolers were approximately 8 feet by 18 feet, supplemented with a separate skid for the train of cold blowers to provide the vacuum.

Figure 4:
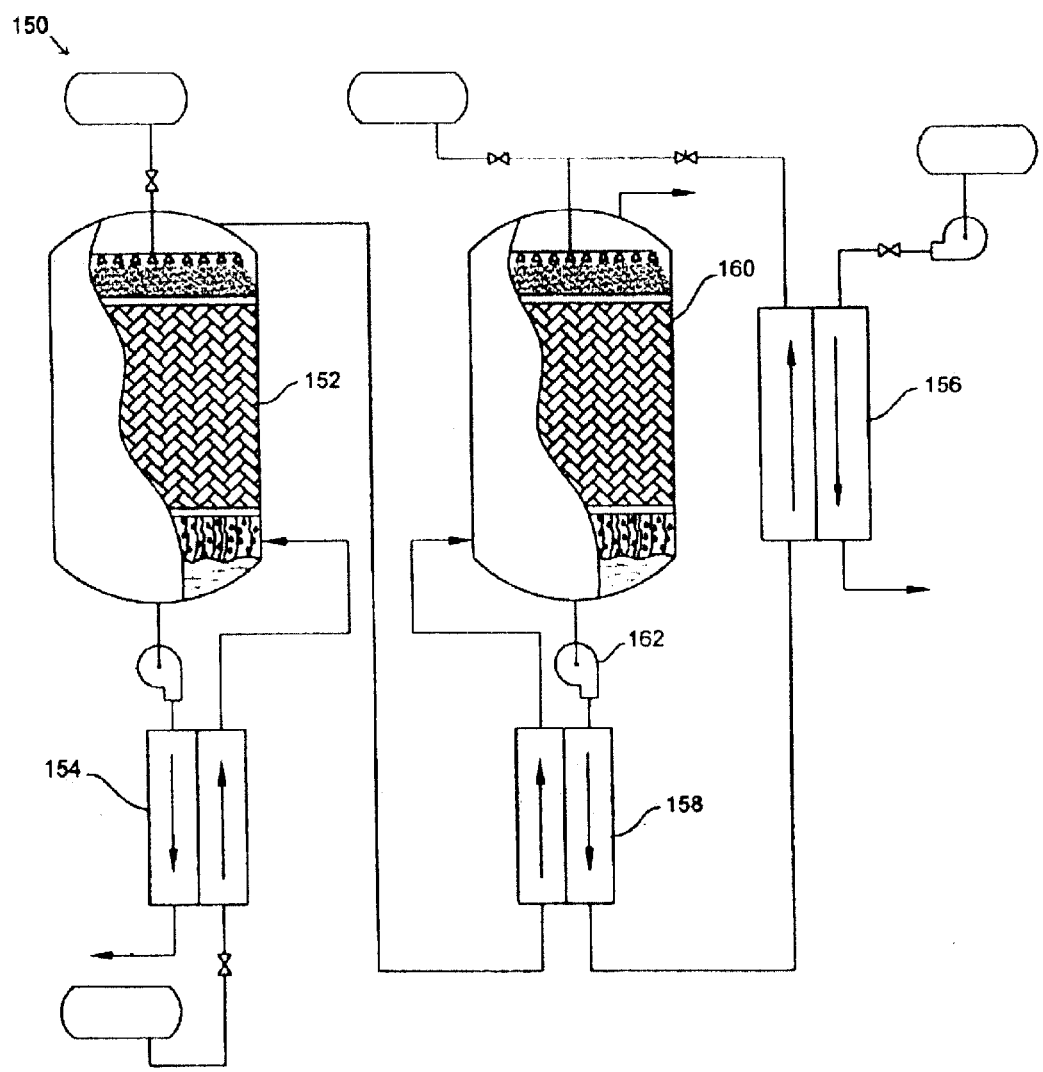
FIG. 4 is a diagram of a dual liquid densifier in accordance with one embodiment of the present invention.

Another preferred system 150 of the present invention is shown in FIG. 4. This system may be used to simultaneously densify both liquid oxygen and liquid hydrogen. This system preferably uses two towers 152, 160. Liquid helium is preferably introduced through a vaporizing heat exchanger 154 into the bottom of the hydrogen tower 152 against a downflow of liquid hydrogen. The cooled liquid hydrogen, cooled further in the heat exchanger 154, may be pumped directly to the launch pad. The mixture of hydrogen and helium emerging from the top of the tower 152 is passed through a heat exchanger 158 and introduced into the bottom of the nitrogen tower 160 against a downflow of liquid nitrogen. The cooled liquid nitrogen is then circulated through another heat exchanger 156, cooling a countercurrent stream of liquid oxygen, and is preferably recycled to the tower 160. The cooled liquid oxygen may then be pumped to the launch pad or other destination. The hydrogen, helium, and vaporized nitrogen at the top of the tower 160 may be vented to atmosphere, collected in a gas bag for subsequent helium recovery, or otherwise properly disposed of. This system preferably utilizes only three heat exchangers, two packed towers, and a liquid pump.

Figure 7:
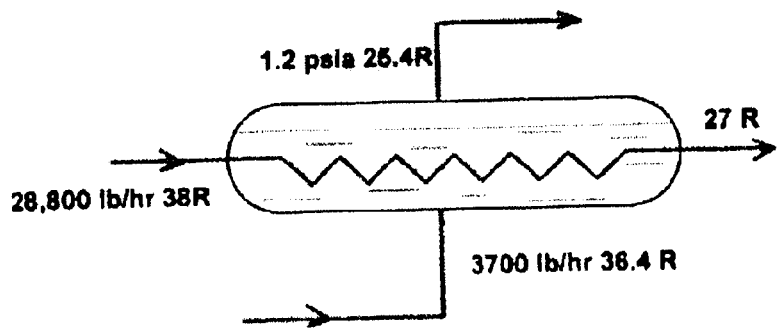
FIG. 7 is a diagram of a hydrogen densifier of the prior art.

This preferred system was also sized to give a direct comparison with the NASA system. The NASA system consisted of two stages of submerged coils for liquid oxygen shown in FIG. 6, one at atmospheric pressure and the other at 2.4 psia, and one set of submerged coils for liquid hydrogen operating at 1.2 psia as shown in FIG. 7. The hydrogen and oxygen flows in the NASA system were not stoichiometric, but were in the preferred embodiment. The temperatures were the same as the NASA system. Correcting the NASA system to stoichiometric proportions, it would use 24,700 lb/hr of LN2 and 1856 lb/hr of LH2. This can be compared with 19,418 lb/hr of LN2, 1380 lb/hr of LH2, and 790 lb/hr of LHe in the preferred system. Combining both fluids in this embodiment, the densification achieved was 8.6%.

It must be emphasized that these embodiments are only order of magnitude estimates, based on limited data, mainly for the purpose of demonstrating embodiments of the present invention. Several variations are possible that may in fact be preferable. The tower pressure and hydrogen flow may be varied, along with tower height and use of packings.

The cooling process in all cases is very similar to that of a cooling tower, where the driving force for evaporation is the difference between the vapor pressure of the descending liquid and the partial pressure of the vapor in the ascending gas stream. In the oxygen example (FIG. 2), this difference is 19.7–12.9, or 6.8 psi at the top of the tower. At the bottom it is the vapor pressure of the nitrogen at 119 R, which is 4 psi. Presumably, a higher tower could reduce this value, leading to better performance. In the double tower example (FIG. 5), these values are 18.7–15.9, or 2.8 psi at the top of the H2 tower, and 2.6 psi at the bottom. For the N2 tower the values are essentially the same as in FIG. 2.

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, or through the use of equivalent process steps, so as to be able to practice the present invention without departing from its spirit as reflected in the appended claims, the text and teaching of which are hereby incorporated by reference herein. It is the intention, therefore, to limit the invention only as indicated by the scope of the claims and equivalents thereof.

References:

Brown et al, *Unit Operations*, 542–552, John Wiley and Sons, 1950.

Lobo W. E. et al, *Trans. Am. Inst. Chem. Engrs.* 41, 693, 1945.

What is claimed is:

1. A system for densifying liquid hydrogen, said system comprising:
    conduit carrying a flow of liquid hydrogen and a flow of helium; and
    a packed tower, said packed tower adapted to allow thermal interaction of said helium with said liquid hydrogen, said helium and said liquid hydrogen flowing in opposing directions through said packed tower, said packed tower adapted so that said liquid hydrogen is cooled through said thermal interaction before leaving said packed tower, said packed tower adapted to direct any vaporized gas comprising said helium and said hydrogen out of said packed tower.

2. A system according to claim 1 additionally comprising a heat exchanger, said heat exchanger adapted to allow thermal interaction of said liquid hydrogen with said helium, said liquid hydrogen and said helium flowing in opposing directions through said heat exchanger, said heat exchanger controlled so that said helium is vaporized through said thermal interaction before leaving said heat exchanger and entering said packed tower, said heat exchanger adapted to further cool said liquid hydrogen exiting said packed tower.

3. A system according to claim 1 additionally comprising at least one pump adapted to generate said flow of said hydrogen and helium.

4. A system according to claim 1 additionally comprising conduit adapted to direct said densified hydrogen into at least one fuel tank.

5. A system according to claim 4 additionally comprising conduit adapted to recirculate said densified hydrogen from said at least one fuel tank through said system.

6. A method for densifying liquid hydrogen, said method comprising the steps of:
    passing a flow of liquid hydrogen through a packed tower; and
    passing a flow of helium through said packed tower, said helium flowing through said packed tower in a direction opposite said flow of liquid hydrogen, said packed tower adapted to allow thermal interaction of said helium with said liquid hydrogen, said packed tower adapted so that any vaporized hydrogen or vaporized helium is passed from said packed tower, said packed tower adapted so that said flow of liquid hydrogen is cooled so as to density said liquid hydrogen.

7. A method according to claim 6 additionally comprising the step of passing said cooled liquid hydrogen exiting said packed tower and said flow of helium through a heat exchanger, said flow of helium passing through said heat exchanger before entering said packed tower, said flow of helium passing through said heat exchanger in a direction opposite said flow of liquid hydrogen, said heat exchanger adapted to allow thermal interaction of said helium with said liquid hydrogen, said heat exchanger adapted to further cool said liquid hydrogen exiting said packed tower.

8. A method according to claim 6 additionally comprising the step of capturing said flow of densified liquid hydrogen exiting said heat exchanger.

9. A method according to claim 6 additionally comprising the step of venting said flow of vaporized hydrogen and helium to atmosphere.

10. A method according to claim 6 additionally comprising the step of directing said flow of densified hydrogen to a fuel tank.

* * * * *